Feb. 13, 1940.  C. P. WALKER  2,190,141
PRESSURE WAVE VELOCITY MEASURING SYSTEM
Filed April 29, 1939
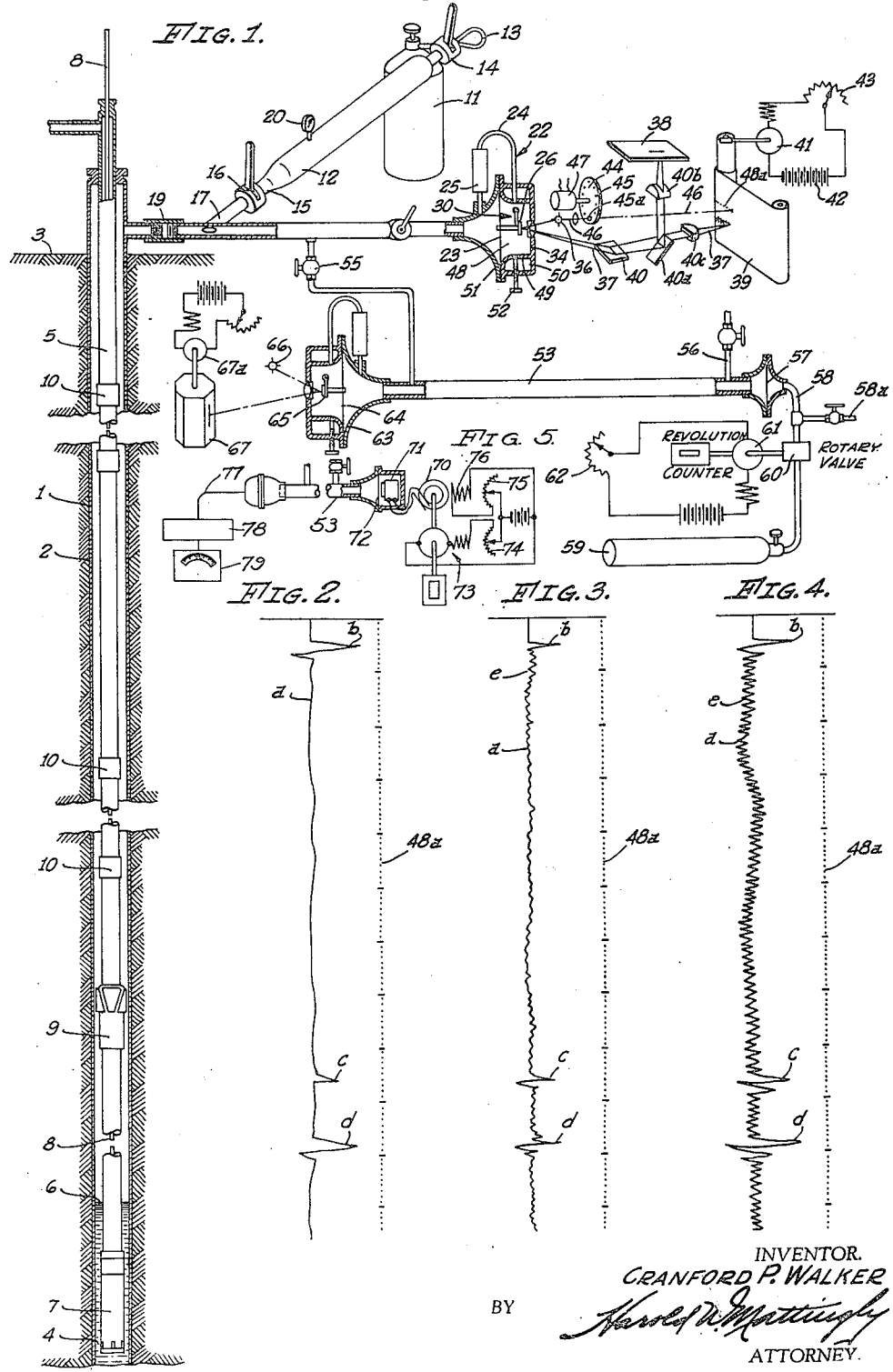
INVENTOR.
CRANFORD P. WALKER
BY
ATTORNEY.

Patented Feb. 13, 1940

2,190,141

UNITED STATES PATENT OFFICE 2,190,141

PRESSURE WAVE VELOCITY MEASURING SYSTEM

Cranford P. Walker, San Marino, Calif.

Application April 29, 1939, Serial No. 270,866

11 Claims. (Cl. 181—0.5)

My invention relates to sonic methods of determining the location of obstructions in deep wells, such as oil wells, and has particular reference to the method and apparatus for readily determining the velocity of sound waves or pressure waves in a particular well under measurement.

This application is a continuation in part of my copending applications Serial No. 162,699, filed September 7, 1937, (which has now issued as United States Letters Patent No. 2,156,519, dated May 2, 1939) and Serial No. 164,534, filed September 18, 1937, (which has now matured into United States Letters Patent No. 2,161,733, dated June 6, 1939) in the first of which applications is described and claimed the system for measuring the location of obstructions in wells and in the latter of which is described and claimed an electrical system of receiving and translating echoes from wells.

During the active life of an oil well it is desirable from time to time to determine the location of the fluid level within the well for the purpose of determining the type of pumping apparatus most desirable to be used, determining the rate of flow of oil into the well, and for making other determinations desirable in the most efficient operation of the well.

Prior methods of determining the location of the fluid level or the location of other obstructions in the well have been generally of two types, one in which measuring apparatus has been lowered from the ground surface to determine, by the length of cable or line extended into the well, the depth or location of the fluid or other obstructions encountered by the instrument as it is lowered.

Among devices to be lowered into the well is also included a pressure recorder which may be lowered into the well on a wire, the length of which is metered to determine the static pressure in the well at different levels, a variation of which includes a pressure recorder with a clock-driven chart lowered on the bottom of the pump to obtain a record of the operating pressures or levels of the fluid. A further variation is that of lowering a bailer upon a rope and either measuring the wetted surface of the rope or repeatedly lowering the bailer until it brings up fluid, measuring the length of the line upon such occurrence. The other method is that of producing sound waves in the well and noting the elapsed time between the introduction of the sound and its return as an echo from the surface of the fluid or other obstruction encountered.

In my copending application noted above, of which this application is a continuation-in-part, I have disclosed a system for measuring the location of obstructions by introducing into the well a pressure impulse either by injecting a quantity of gas under greater pressure than that existing in the well or liberating from the well a quantity of gas so as to produce a pressure wave which will travel down the well and produce echoes thereof from the various obstructions in the well including tubing couplings, tubing catchers, liquid surface liner tops and other pieces of apparatus which may be located therein and which will result in restrictions of the space between the tubing and the casing of the well.

However, in measuring the locations of obstructions by such method, it is noted that each well has different pressure wave transmission characteristics dependent upon the temperature and density of the gas existing in that particular well as well as dependent upon the particular composition and character of the gas in the particular well under measurement so that upon plotting the echoes from the various obstructions against time lapse between the creation of the impulse and the arrival at a suitable receiving device of the echo from a particular obstruction, compensation must be made for the pressure wave velocity in the particular well under measurement, and it is therefore a primary object of this invention to produce a system for accurately measuring the pressure wave velocity in a particular well which is under test.

Another object of my invention is to provide a system of the character set forth in the preceding paragraph wherein a portion of the gaseous content of the well is led through a resonance device into which vibrations of varying frequency may be introduced to compare the resonant frequency of the device when filled with such gaseous medium as compared with the resonance frequency of the same device when filled with air.

Another object of my invention is to provide a device of the character set forth in the preceding paragraphs wherein the relation between the frequency of the vibrations and their transmission characteristics in the medium may be readily observed.

Other objects of my invention will be apparent from a study of the following specifications, read in connection with the accompanying drawing, wherein—

Fig. 1 is a diagrammatic view illustrating a typical well cross section and the location and character of the apparatus required for determining the fluid level or location of other obstructions in the well in accordance with my method;

Fig. 2 is a diagrammatic view illustrating the type of record or indication which may be made with my method in its simplest application;

Fig. 3 is a diagrammatic view similar to Fig. 2 and illustrating the type of record or indication which may be made with my method but in which echoes produced by intermediate obstructions are not amplified;

Fig. 4 is a diagrammatic view similar to Figs. 2 and 3 and illustrating the type of record or indication which may be made with my record, including the amplification of echoes from intermediate obstructions; and Fig. 5 is a diagrammatic view of a modified form of velocity measuring instrument which may be substituted for the velocity measuring instrument illustrated in Fig. 1.

Referring to the drawing, I have illustrated in Fig. 1 a typical oil well comprising the earth bore 1, usually lined with casing 2 or pipe of relatively large diameter, extending from the ground surface at 3 to the oil bearing sands at 4 where the casing is either perforated or is provided with a perforated liner through which the oil from the sands may enter to the interior of the casing. The casing is, of course, constructed of a plurality of lengths of pipe secured together by couplings or collars in any well known manner. A second pipe or string of pipes extend down through the casing 2, this string of pipe being known as the oil flow tubing, indicated at 5, extending from the ground surface down to a position disposed below the level of the fluid in the well, which is indicated at 6, the lower end of the tubing string 5 having a pump 7 of any desired character located therein. Such pumps are usually operated by means of a string of sucker rods 8 which extend upwardly through the tubing string 5.

It is the common practice to employ in the tubing string 5 a tubing catcher 9 which may be of any of the well known constructions, the tubing catcher being usually located a relatively short distance above the level of the fluid in the well so that should the tubing string break, the tubing catcher 9 will grip the casing and prevent complete destruction of the tubing string. One or more of the tubing catchers 9 may be distributed throughout the length of the tubing string 5.

The tubing string 5 is constructed of a plurality of lengths of pipe coupled together by means of collars 10, which collars are usually of somewhat larger outside diameter than the outside diameter of the tubing from which the oil flow tubing is made.

Hence it will be noted that in the ordinary oil well there are a plurality of obstructions, each of which is capable of receiving and reflecting a sound wave or pressure wave passing down through the well, these obstructions including the fluid surface 6, the tubing catcher 9 and each of the collars 10 of the tubing string.

As is explained in my copending application heretofore referred to, the location of the fluid level 6 or of any other obstruction in the well may be readily determined by producing in the well a pressure impulse such as will create a low frequency wave, and then translate the echoes received from the well in terms of echo impulses received from the various obstructions. By comparing the time lapse between the production of said pressure impulse and the receipt of the echo from the obstruction, the location of which is desired, the exact location of such obstruction may be accurately measured.

The pressure impulse necessary to produce the desired echoes may be produced by the methods illustrated in and described in United States Letters Patent to Lehr et al. No. 2,047,974, issued July 21, 1936, or as illustrated in my copending application hereinbefore referred to, as by providing a suitable connection to the casing 2 of the well which will permit either the injection into or release from the well casing of a predetermined volume of gas, it being understood that if gas under pressure is to be introduced into the well the same may be supplied from a suitable tank or other pressure source having a pressure sufficiently in excess of the pressure of the gas within the well to create a substantial differential pressure. For example, if the well gases at the casing head are at a pressure of 500 pounds per square inch, the pressure source must be capable of delivering, say, 600 pounds per square inch or more in order to create a pressure impulse of sufficient magnitude to produce the desired echoes.

As illustrated in Fig. 1, such pressure source is shown as a tank 11, being coupled to a pressure chamber 12, one end of which is connected as by means of tube 13 and valve 14 to the pressure source 11, while the opposite end of the pressure chamber 12 is connected by means of a nipple 15, a quick-opening valve 16 and a nipple 17 to a length of pipe 18 which is in turn coupled as indicated at 19 to the well casing 2. The pressure chamber 12 is preferably provided with a suitable indicating pressure gage 20 by which the pressure within the pressure chamber 12 may be readily measured. Thus for the production of the pressure wave all that is necessary is to close valve 16, open valve 14 and allow pressure to be built up in the pressure chamber 12 to the desired pressure value, say, 600 pounds per square inch. Then the valve 14 is closed and valve 16 opened, allowing an impulse of 600 pounds per square inch to be injected into the well casing (the static pressure of which is, for example, 500 pounds per square inch).

A receiving device for receiving and registering the echoes of the pressure impulse from the various obstructions within the well is illustrated as including the pipe 18 and pressure responsive device coupled thereto, through a valve 21 to a diaphragm chamber 22, permitting a flexible diaphragm 23 to be placed into communication with the casing 2 whenever the valve 21 is opened. To control the sensitivity of response of the diaphragm 23 and in order to prevent undue distortion of the diaphragm 23 by the static pressure in the well and to avoid damage which would result therefrom, I prefer to allow the static pressure in the well casing 2 and pipe 18 to be equalized on both sides of the diaphragm 23 as by providing a by-pass 24 providing a restricted passage through which gas pressure in the chamber 22 on one side of the diaphragm may pass to the opposite side of the diaphragm, the filter 25 being interposed in the by-pass if desired to dry out the gas and prevent undue corrosion of the more delicate parts of the device contained in the diaphragm chamber 22. Attached to the diaphragm 23 is a mirror 26. In the front wall 34 of the diaphragm chamber 22 I mount a lens 35, through which light from a suitable light source 36 may pass into the chamber 22 to be reflected by the mirror 26, the reflected beam 37 passing back through the lens 35, as a ribbon beam which may be reflected or directed upon a ground glass screen 38 and upon a recording chart or strip of sensitized tape 39 to make a permanent record of the path described by the light beam 37. Suitable reflectors, such as indicated at 40, may be employed to direct the beam in any desired direction while a reflector 40a may be interposed in a portion of the ribbon beam 37 to direct a portion thereof upon the screen 38, suitable condenser lenses 40b and 40c being interposed in the beam to draw the same to a point beam upon the screen 38 and tape 39.

Thus as the pressure within the casing 2 is varied as by the pressure wave resulting from the pressure impulse created within the casing 1, the mirror 26 will be moved, the amplitude of its movement representing the amplitude of the pressure variation. As the echo of the pressure impulse from any obstruction within the well is received upon the diaphragm 23, the mrrror 26 will be moved in accordance with the amplitude of the echo impulse and will cause the echo impulses to be registered for observation, both by directing the light beam 37 upon the ground glass 38 where the amplitude of the echo may be visually observed and, by directing the light beam 34 upon the recording tape 39, a permanent record of the pressure wave which is created within the casing 2 may be made and this wave or chart will show peaks of varying amplitude, each of which peaks represents an echo from a particular obstruction within the well, either the tubing collars 10, the tubing catcher 9 or the fluid surface 6.

The sensitized strip 39 may be arranged to be driven at any desired speed by means of a variable speed motor 41 coupled to a suitable source of current 42 through a rheostat or other speed adjusting device 43 so that the tape or strip 39 may be driven at variable speeds.

By employing some device which will produce upon the record strip 39 a time lapse measurement, a direct comparison between the path described by the light beam and the lapse of time may be accomplished. I prefer to provide such mechanism including means for producing upon the strip 39 a series of dots or marks, each of which represents a fraction of a second, the line of dots or marks extending substantially parallel to the general direction of the wave chart described by the light beam 37. This may be readily accomplished by providing a disc 44 having a plurality of openings 45 therein adapted to be rotated in the path of a secondary light beam 46 emanating from the light source 36. The light beam 46 passing through the openings of the disc 44 may be projected upon the same sensitized strip 39 to describe a series of marks thereon, one for each of the openings 45. One of the openings 45a is preferably larger than the remainder so that upon each revolution of the disc 44 a distinguishing mark will be produced. Thus by providing ten openings 45, a series of marks 48a may be produced upon the record strip 39 representing ten equal divisions. The tenth mark being produced by the large opening 45a is of greater length or of greater size or in some other manner distinct from the remaining nine marks. By providing the disc 44 with any suitable time mechanism such as a synchronous motor 47, the marks produced upon the charts will represent lapse of time; for example, each mark representing $\frac{1}{10}$ of a second while the space between the distinct marks will represent lapses of one second each.

Due to the fact that the depth of wells varies considerably and, further, due to the fact that conditions of obstruction or constriction of the space between the well casing 2 and the tubing string 5 varies considerably in different wells, the same pressure differential cannot be used successfully in all wells and it is necessary to vary the pressure impulse through considerably wide limits, dependent upon the conditions encountered at a particular well. For this reason I prefer to direct a portion of the beam 37 upon the ground glass screen 38 so that by firing one charge of gas pressure into the well and observing the path described by the light beam, a determination of whether or not the correct pressure impulse is being used may be made. For example, one pressure impulse which is estimated to be correct for a given well may not produce a sufficient fluctuation in the echo waves received from the tubing catcher and the fluid surface, and a higher pressure or greater quantity of gas must be used in order to create the desired impulse. Thus by observing the effect of a succession of pressure impulses liberated into the well, the person making the survey will be able to determine which of the echoes rebounds from the tubing catcher and which of the echoes rebounds from the fluid surface.

The typical desired configuration of the path described by the light beam 37 is indicated at Fig. 2 wherein a represents the path described by the light beam as a result of the pressure wave created by a discharge of gas from the chamber 12 into the well casing. From an inspection of the line a, it will be noted that this line is a relatively straight but somewhat wavy line, having distinct peaks at b, c and d. The peak b is that which will be produced by the deflection of the diaphragm 23 when the impulse of gas from the chamber 12 is liberated into the casing 2. At a predetermined time thereafter, dependent upon the velocity of the wave in the particular well, a peak c will be produced as a reflection from the tubing catcher 9, while at a predetermined time thereafter an additional peak or series of peaks will be produced at d as a reflection of the wave from the fluid surface.

Thus by observing the effects of a series of pressure impulses of different intensity or pressure, the operator may determine which impulse is most desirable to produce the distinctly recognizable and differentiatable peaks c and d, allowing him to differentiate between echo from the tubing catcher and the echo from the fluid surface. As hereinbefore stated, knowing the depth or location of the tubing catcher 9, the comparison of the elapse time between the peaks b and d, an accurate determination of the fluid level may be produced.

After the most desirable pressure impulse has been determined, the motor 41 may be set into action and a permanent record of the path described by the light beam may be made upon the sensitized film 39 with assurance that the various peaks b, c, and d will be readily distinguishable upon the diagram so produced.

As will be observed from an inspection of Fig. 2, the diagram on the strip 39 also shows the plurality of spaced dots or other means of indicating elapsed time, such series of dots being indicated at 48a.

Having made a diagram as indicated in Fig. 2, a direct measure and determination of the fluid depth may be achieved. Also it will be observed that by selecting impulses of the desired magnitude, reflections from other obstructions in the well may be noted and recorded, thus assisting in the location and determination of other restrictions as well as a measurement of the fluid level.

For example, each of the collars 10 of the tubing string will produce a distinct echo differentiatable from the echoes from other sources. This allows the accurate measurement of the fluid level in a well where, by reason of failure to keep records or loss of records, the location of the tubing catcher is not known or wherein the catcher is submerged or is omitted. For example, in some wells tubing has been drawn out and replaced by other tubing and no record has been made of the lengths of tubing drawn out or the lengths of each section drawn out or the length or number of tubing section employed to replace them so that to merely compare the time distance between the peaks b and c would not give a true indication of the velocity of the wave in the particular well. However, if it is reasonably assured that each of the tubing lengths is approximately the same, and the usual practice in oil wells is to employ tubing lengths in a given well, all of which are the same, an indication of the number of tubing lengths located within any given well, multiplied by the average length of a tubing section, will give a true measure of the location of the tubing catcher or the location of the pump or other device which constitutes an obstruction in the well. Thus, for example, by selecting a desired pressure impulse, by comparison of a succession of pressure impulses and the waves produced thereby, upon the ground glass 38, a wave or line of the character indicated at a in Fig. 3 may be produced wherein, though a is still wavy, it is produced by a series of peaks e. By counting the number of these peaks, each of which represents a reflection back from a collar 10, the number of lengths of tubing between the peaks b, c and d may be determined.

As is explained in my copending application, it may be desirable to accent the echoes from the tubing collars to permit a more ready registration and counting thereof by providing tuning means which will tune the receiving and registering and recording mechanism to peculiarly respond to the frequency of the tubing collar echoes and thus produce echoes therefrom which are readily distinguishable from echoes from other obstructions or recorded waves created by disturbances, such tuning being illustrated particularly herein as including the coupling pipe 18 selected of such length as to produce a beat or amplification of the tubing collar echoes. Such pipe 18 may be selected as of some fractional multiple of the length of each of the tubing sections or may be provided as indicated with an adjustable coupling 19 which allows the accurate lengthening or shortening of the pipe 18 until, by observing the path of the light beam upon the ground glass 38, a distinct pattern is made represented by the line a on Fig. 4, in which each of the intermediate peaks e is amplified as indicated in Fig. 4 so that it is readily recognizable.

However, it frequently occurs that the records relating to a particular well may not be sufficiently complete or accurate to allow a ready determination of the length of each of the tubing sections or tubing sections of different lengths may have been used in the same well or for some other reason it may be undesirable or impractical to employ the counting of the tubing collar echoes for the purpose of determining the velocity of the pressure wave through the particular gaseous medium encountered in a particular well. I therefore provide a ready method of determining this velocity by employing an elongated tube or pipe 53 coupled as by means of a short pipe 54 to the pipe 18 and controlled by a valve 55 in such manner as to permit gas from the casing 1 to flow through the pipe or tube 53, thus providing in the pipe 53 an atmosphere corresponding to the atmosphere or gaseous medium in the casing 1. An open exhaust pipe 56 leads from the opposite end of pipe 53 open to the atmosphere or connected to a gas flow line so that the pressure within the pipe or tube 53 will remain susbtantially constant as to the value of the gas in the casing 1. Near one end of the tube 53, a diahragm 57 may be provided and arranged to be vibrated at any desired frequency as by coupling the diaphragm 57 by a pipe 58 open to the atmosphere at 58a, to a source of fluid pressure, such as compressed air, indicated at 59.

A rotary valve 60 is interposed in the pipe 58 and arranged to be driven by means of a variable speed motor 61 regulated as to speed by means of a suitable rheostat or other controlling device 62 so that by rotating the motor 61 at any speed a series of pressure impulses will be created in the pipe 58, and will beat upon diaphragm 57 to create a pressure wave in the tube or pipe 53 of known frequency, the frequency being variable by varying the speed of motor 61.

At the opposite end of the pipe 53 I couple a pressure responsive device which may be constructed in the same manner as the diaphragm chamber 22 and diaphragm 23 hereinbefore described. This pressure responsive device is illustrated at 63 coupled directly to the end of the pipe 53, the diaphragm 64 of which receives the impulses transmitted through the pipe 53 to vibrate in response thereto and to move a mirror 65 in the same manner as was described with reference to the mirror 26. The mirror 65 reflects a light beam from a suitable source 66 upon a polygon of mirrors 67 revolved by means of an adjustable speed motor 67a at a speed synchronous with the speed of the motor 61 so that amplitude and uniformity of the vibrations of the diaphragm 64 may be visibly observed.

As is well known in the art, each gaseous medium, variable as to density, temperature, etc., is resonant to pressure waves or sound waves of predetermined frequency. Thus by varying the speed of operation of the motor 61 until the pressure impulse created by the diaphragm 57 makes one round trip (or multiple thereof) through the length of pipe 53 to the diaphragm 64 and back to the diaphragm 57 in time to just synchronize with the next impulse created by the diaphragm 57, the wave pattern described by the beam of light on the mirrors 67 will show its maximum amplitude, and noting the frequency of the impulses produced upon the diaphragm 57 (that is, noting the speed of the motor 61) the velocity of the sound through this particular gaseous medium may be readily determined by comparing this frequency with the frequency at which perfect resonance is achieved in the pipe 53 with air in it. By perfect resonance, it will be understood, is meant either the basic frequency at which the effective length of the pipe will resonate or some multiple of this frequency.

In Fig. 5 I have illustrated an electrical frequency producing and regulating mechanism which may be substituted for the mechanical arrangement of pressure source 59, rotary valve 60 and variable speed motor 61 to produce regulated frequency vibrations within the pipe and electrical receiving and translation mechanism which may be substituted for the mechanical receiving and translation mechanism 63—67a shown in Fig. 1. Instead of employing a source of air pressure, I may employ a small alternating current generator indicated at 70 coupled to an electromagnet 71 which will operate upon a metal diaphragm 72 in the same manner as the pressure impulses are employed to vibrate the diaphragm 57. Again the frequency of vibration which will be produced in the diaphragm 72 may be readily controlled and regulated by regulating the speed of the generator 70 as by driving the same by an electric motor 73 corresponding in all respects to the electric motor 61 shown in Fig. 1, the speed of rotation of the motor 63 being controlled by a suitable regulator or rheostat 74. If desired, a control rheostat 75 may be imposed in the field winding 76 of the generator 70 so as to control the strength of the current output of the generator and thus regulate the amplitude of vibration given to the diaphragm 72. The entire diaphragm and control structure may be substituted upon the end of the pipe 53 through which the gases from the well may be led in the same manner as was described with reference to Fig. 1.

At the opposite end of the pipe 53, a suitable microphone may be employed to receive and translate the vibrations transmitted along the pipe 53, such microphone being of any suitable character though for purposes of illustration, I have shown a diaphragm type of microphone similar to that illustrated in my copending application Serial No. 164,534 (of which this application is a continuation in part). The output of the microphone may be passed by means of a conductor 77 through a suitable detector-amplifier indicated at 78, the output of which may be connected to a suitable voltmeter 79 so that whenever the voltmeter needle arrives in a position indicating maximum amplitude of transmission of the frequency imposed upon the diaphragm 72, it will indicate that perfect resonance has occurred in the pipe.

Employing either the mechanical arrangement illustrated in Fig. 1 or the electrical arrangement illustrated in Fig. 5, the velocity of sound waves or pressure waves through the particular gas passed into the pipe may be readily compared with the velocity of such sound waves in air so that suitable correction may be made of the time lapse between the creation of the pressure impulse and the echo back from the unknown obstruction to accurately determine the number of feet between the unknown obstruction and the ground surface. This velocity will vary with different gravities of gas so that the resonance tube 53, as described herein, may be utilized for the purpose of measuring the gravity of the gas by comparing the frequency required to achieve resonance in the pipe filled with the gas with the frequency at which resonance is achieved when the pipe is filled with air.

Also it should be noted that shortening or lengthening the effective length of the pipe or tube 53 may be employed either with a constant frequency applied to the diaphragm 57 (or 72) or in combination with a variable frequency, the essential feature being, of course, the comparison between the effective length of the tube 53 and the frequency at which resonance occurs when the pipe is filled with gas or is filled with air.

It will therefore be observed that I have provided a method of determining the location of obstructions in wells and accurately locating and measuring the fluid level in a well without the necessity of removing any of the apparatus from the well, the entire measurement and determination being accomplished in a relatively short time.

It will also be noted that I have provided a ready means for determining accurately the pressure wave velocity obtaining in any particular well upon which the liquid level or location of other obstructions is to be measured.

While I have shown and described the preferred embodiment of my invention, I do not desire to be limited to any of the details of construction shown or described herein, except as defined in the appended claims.

I claim:

1. In an apparatus for determining pressure wave velocity in a given medium, an elongated tube, means communicating with said tube for passing the said medium through said tube, means associated with said tube for creating pressure waves of known frequency in said tube, means associated with said pressure wave creating means for varying said frequency, and means communicating with said tube for determining when the frequency is such as to resonate in the medium in the tube.

2. In an apparatus for determining pressure wave velocity in a given medium, an elongated tube, means communicating with said tube for passing the said medium through said tube, means associated with said tube for creating pressure waves of known frequency in said tube, means associated with said pressure wave creating means for varying said frequency, and means communicating with said tube for observing pressure fluctuations in said tube to determine resonance of the waves in said medium.

3. In an apparatus for determining pressure wave velocity in a given medium, an elongated tube, means communicating with said tube for passing the said medium through said tube, means associated with said tube for creating pressure waves of known frequency in said tube, means associated with said pressure wave creating means for varying said frequency, diaphragm means communicating with said tube for movement under the influence of pressure variations in said tube, a source of light, means associated with said diaphragm for directing a light beam from said source upon a screen whereby observing the form and amplitude of movement of said light beam on said screen, resonance of said frequency in said medium may be observed.

4. In an apparatus for determining pressure wave velocity in the gaseous medium of oil wells, an elongated tube, means coupling said tube to the casing of the well to pass the gaseous medium in the well through said tube, means for creating in said tube pressure waves of known frequency, and means associated with said tube for determining when the frequency is such as to resonate in the medium in the tube.

5. In an apparatus for determining the pressure wave velocity in the gaseous medium within an oil well, an elongated tube having an inlet adjacent one of its ends and an outlet adjacent the other of its ends, means coupling the inlet of said tube to the casing of a well for passing gases from said well through said tube and through the outlet thereof, means associated with said tube for creating pressure waves of known frequency in said tube, means associated with said pressure wave creating means for varying said frequency, and means associated with said tube for determining when the frequency is such as to resonate in the medium passing through said tube.

6. In an apparatus for determining the pressure wave velocity in the gaseous medium within an oil well, an elongated tube having an inlet adjacent on of its ends and an outlet adjacent the other of its ends, means coupling the inlet of said tube to the casing of a well for passing gases from said well through said tube and through the outlet thereof, a diaphragm exposed to the interior of said tube at one end thereof, means for vibrating said diaphragm at a controlled variable frequency, a second diaphragm exposed to the interior of said tube at the opposite end thereof, and means actuated by vibrations of said second diaphragm for measuring the amplitude of movement of said second diaphragm.

7. In an apparatus for determining the pressure wave velocity in the gaseous medium within an oil well, an elongated tube having an inlet adjacent one of its ends and an outlet adjacent the other of its ends, means coupling the inlet of said tube to the casing of a well for passing gases from said well through said tube and through said tube and through the outlet thereof, a pair of diaphragms exposed to the interior of said tube and disposed at opposite ends of said tube respectively, a source of pressure, means for intermittently releasing pressure from said source to impinge upon one of said diaphragms, means for variably controlling the frequency of the releases of said pressure, means associated with the other of said diaphragm and actuated by movement thereof for measuring the amplitude of the movements of said second diaphragm, said last named means including means for projecting a beam of light from said light source and for moving the same in correspondence to the amplitude of movement of said diaphragm, a series of mirrors mounted upon a rotatable member and successively moved into the path of said beam of light, and means for rotating said series of mirrors at a variable speed to present said mirrors successively to said beam of light at a rate corresponding to the rate of vibration of said first named diaphragm.

8. In a system for determining pressure wave velocity in a given medium, an elongated tube, means for passing the said medium through said tube, means for creating pressure waves in said tube of known frequency including a diaphragm exposed to the interior of said tube, magnetic means for vibrating said diaphragm, a source of variable frequency electric current supplying said magnet, means for determining the frequency at which said tube resonates including a second diaphragm exposed to the interior of said tube and spaced from said first diaphragm, said diaphragm comprising one element of a microphone, and electrical means for translating vibrations of said second diaphragm in terms of electrical current variations, translating means for receiving said current variations and for indicating the amplitude of movement of said second diaphragm.

9. In a system for determining pressure wave velocity in a given medium, an elongated tube, means for passing the said medium through said tube, means for creating pressure waves in said tube of known frequency including a diaphragm exposed to the interior of said tube, magnetic means for vibrating said diaphragm, a source of variable frequency electric current supplying said magnet, means for determining the frequency at which said tube resonates including a second diaphragm exposed to the interior of said tube and spaced from said first diaphragm, said diaphragm comprising one element of a microphone, and electrical means for translating vibrations of said second diaphragm in terms of electrical current variations, translating means coupled to said microphone including a galvanometer for measuring the amplitude of movement of said microphone whereby maximum movement of said galvanometer indicates when resonance occurs.

10. In an apparatus for determining pressure wave velocity in a given medium, an elongated tube, means communicating with said tube for passing the said medium through said tube, means associated with said tube for creating pressure waves of known frequency in said tube, and means communicating with said tube for observing pressure fluctuations in said tube to determine resonance of the waves in said medium.

11. In an apparatus for determining pressure wave velocity in a given medium, an elongated tube, means communicating with said tube for passing the said medium through said tube, means associated with said tube for creating pressure waves of known frequency in said tube, and means communicating with said tube for indicating the magnitude of pressure fluctuations in said tube whereby a condition of resonance of waves in said tube may be observed.

CRANFORD P. WALKER.